Nov. 1, 1938.  I. H. IHM ET AL  2,135,339
RETHREADING MACHINE FOR RESTRICTED BORES
Original Filed March 12, 1935

IVAN H. IHM.
CHARLES F. TUTTLE.
INVENTORS

BY
ATTORNEY

Patented Nov. 1, 1938

2,135,339

UNITED STATES PATENT OFFICE 2,135,339

RETHREADING MACHINE FOR RESTRICTED BORES

Ivan H. Ihm and Charles F. Tuttle, Richmond, Calif., assignors to Standard Oil Company of California, San Francisco, Calif., a corporation of Delaware Original application March 12, 1935, Serial No. 10,622. Patent No. 2,117,327. Divided and this application May 16, 1938, Serial No. 208,147

6 Claims. (Cl. 10—129)

This invention relates to a boring machine and more particularly to one which is adapted to be used for rethreading and similar operations in restricted bores of heavy and relatively immovable equipment, such as pressure still headers which may be in place in a furnace. This application is a division of our co-pending application, Serial No. 10,622, filed March 12, 1935, which issued May 17, 1938, as Patent No. 2,117,327.

Heretofore, it has been the practice, when machining operations are required on the threaded parts of equipment such as pressure still headers, to remove them from their places on the tubes in the furnace, and take them to a shop where the machining is done with conventional equipment. Inasmuch as these fittings are normally securely supported in the furnace and are fastened as firmly as possible to the tubes to prevent leakage and blowing off due to internal pressure, this is a very expensive and inconvenient, as well as time consuming procedure. Certain types of alloy tubes are severely weakened and damaged by the heating which usually accompanies header removal, and in some cases where the tubes are welded to the headers, the tubes must be cut and destroyed, or at least shortened, before the headers can be taken off. This applies particularly to the rethreading operations.

It is an object of this invention to provide a portable means for doing accurate field machine boring, rethreading and the like in heavy and relatively immovable equipment such as pressure still headers.

Another object is to provide a means for accurately aligning and positioning a boring machine tool in a restricted bore to operate on the same.

Another object is to provide a compact and rugged cross-feed means for a boring tool of this type.

Another object is to provide a simple and accurate portable boring and threading machine and guide means therefor, adapted to rethread restricted bores.

These and other objects will be further apparent from the following description and from the appended drawing which forms a part of this specification and illustrates an example of a preferred embodiment of this invention. In the drawing.

Figure 1:
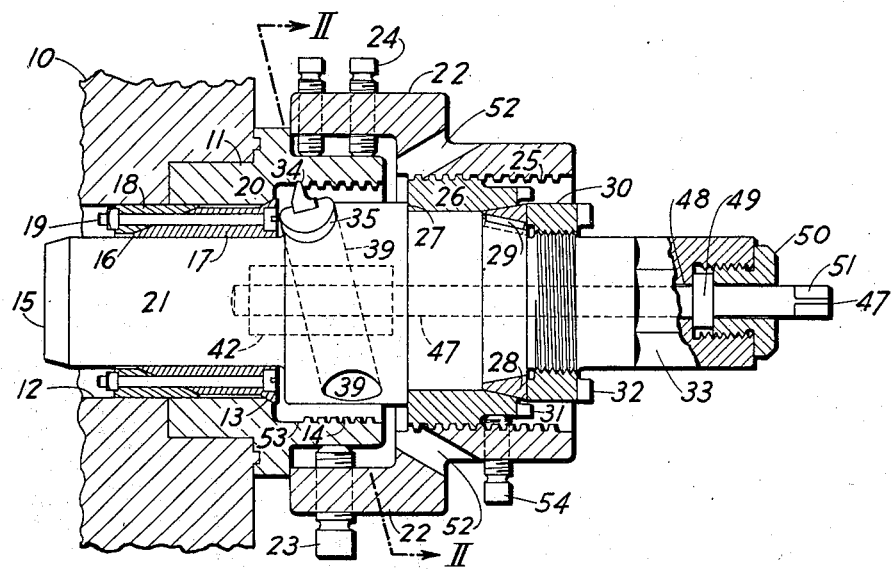
Figure 1 is a side elevation and part sectional view of a rethreading tool in place in a header.

Referring to the drawing, and particularly to Figure 1, the numeral 10 indicates a header, diagrammatically shown here in section and provided with a threaded sleeve 11, the latter having a cylindrical bore 12, terminating in a tapered seat 13, and provided with threads 14 into which correspondingly threaded closure means of any sort may be secured. The body 15 of the tool embodying this invention is generally cylindrical in shape and is adapted to be aligned with threads 14 by means of a bushing generally designated 16, this bushing comprising an inner sleeve 17 and an outer sleeve 18, both provided with complementary tapered surfaces so that they may be secured in bore 12 by means of bolts 19. Alignment of bushing 16 with bore 12 is preferably made by the cooperation of sleeve 18 and a tapered face 20 on the outer end of sleeve 17, which seats on the tapered face 13 of sleeve 11.

The body 15 of the threading tool is preferably reduced in section as at 21 to provide a smooth running fit within bushing 16. In order to control the helical feed of the cutting tool a circular yoke 22 is adapted to be clamped on sleeve 11 or some other part of header 10 by means of centering screws 23 and clamping screws 24. These may be alternately spaced at 60° intervals around the periphery of yoke 22. Yoke 22 has a threaded bore 25 of any convenient diameter larger than body 15, the pitch of the thread being identical with that of threads 14 in sleeve 11. Inasmuch as the "Acme" thread form is usually used in such bores, it may conveniently be used here as shown. An externally threaded guide bushing 26 is adapted to enter the threaded bore 25, and, with that bore, fulfills the function of guiding the body 15 in the desired helical path. Bushing 26 is clamped to a shoulder 27 on the outer end of the tool body 15 by means of a wedge ring 28 secured to the body by key 29 and threaded clamp ring 30. Guide bushing 26 and clamp ring 30 are provided, respectively, with lugs 31 and 32 so that they may be turned by suitable spanners from outside of yoke 22.

The body 15 projects outwardly from yoke 22 and is provided with a hexagon face 33 so that it may be turned by a wrench or any similar turning means. The feed screw arrangement and also the cross-feed for the cutting or rethreading tool is essentially similar to that shown in our co-pending application, now Patent 2,117,327, and will be described in detail below.

Figure 4:
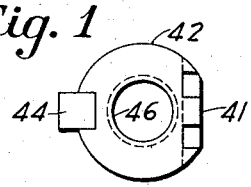
Figure 4 is an end view and Figure 5 is a top view of the keyed feed bar used in this example.
Figure 5:
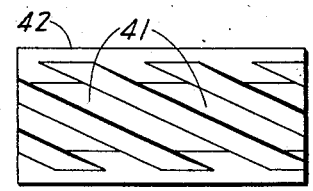
Figure 2:
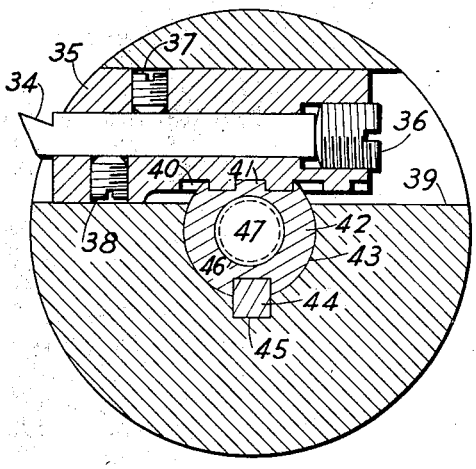
Figure 2 is a vertical sectional view on line II—II of Figure 1 and illustrates the tool holding, feeding and guiding means of this embodiment.
Figure 3:
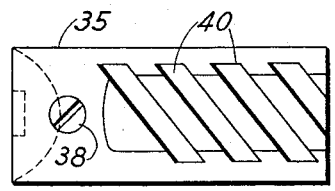
Figure 3 is a bottom view of the tool post used in this example.

The threading tool 34 is secured in a generally cylindrical tool post or holder 35 as by set screws 36, 37 and 38. Holder 35 is received in a generally transverse bore 39 in body 15, the angle of the bore preferably corresponding to one side of the thread profile. Holder 35 is movable longitudinally in bore 39 by means of inclined grooves 40, in which are received complementary inclined teeth 41 on a cylindrical feed bar 42 (Figures 4 and 5).

Feed bar 42 is positioned in a longitudinal bore 43 in body 15 and is prevented from rotating therein by a key 44 received in keyway 45. Feed bar 42 has an axial threaded bore 46 in which a correspondingly threaded feed screw 47 is received. Feed screw 47 extends into bore 43 through a smaller bore 48 and is prevented from moving longitudinally therein by a flange 49, secured in body 15 by a threaded locknut 50. The outer end of feed screw 47 is squared as at 51 to receive a wrench or other turning means so that it may be turned as desired to traverse the threading tool 34.

In operation, the centering wedge members or sleeves 17 and 18 are first inserted in bore 12 and are tightened by bolts 19. Yoke 22 is centered and clamped on the outside of sleeve 11 by screws 23 and 24. The body 15 is inserted in bushing 16 and tool holder 35 is traversed or fed outwardly by feed screw 47 until tool 34 engages the outer thread of sleeve 11. The threaded guide bushing 26 is then clamped to body 15 by keyed wedge ring 28 and clamp ring 30. The rethreading of sleeve 11 may then be accomplished in the conventional manner, body 15 being centered by sleeves 17 and 18 of bushing 16 and guided in a helical path by the threaded guide bushing 26 cooperating with threaded yoke 22. The progress of the machining or rethreading may be observed through sight openings 52 which may be spaced at suitable intervals around yoke 22 as shown in Figure 1.

If it is desired to enlarge the counterbore 53 at the bottom of threads 14 in sleeve 11, this may be done by securing the threaded guide bushing 26 to yoke 22 as by set screws 54, and loosening the threaded clamp ring 30. This will permit body 15 to rotate in a given fixed plane between centering wedge members 17 and 18, and shoulder 27, to machine out the counterbore 53 to the depth required by the deepened threads.

It will be appreciated that this invention is adapted to other uses than that given, and may be described as involving a rotatable body carrying a generally transversely movable tool post and threading tool, with means extending from said body for moving the tool post as may be required, and means for centering the body and also for guiding it in the path which it is desired the tool will take. While a specific construction has been described and illustrated to carry out these operations and functions, it is to be understood that the invention is not limited to that device and all such modifications and changes as come within the scope of the appended claims are embraced thereby.

We claim:

1. A machine tool for cutting or remachining a screw thread in a restricted bore in a body such as a pressure still header, comprising a boring bar, means for axially aligning said bar with said bore, a substantially transversely extensible cutter carried by said bar, a threaded guide member, means for securing said member to said body, and means separate from said cutter engageable, respectively, with said bar and said threaded guide member to be rotated by said bar and to guide said bar and said cutter in a helical path determined by the pitch of the threads on said threaded guide member.

2. A machine tool according to claim 1 in which said last named means comprises a threaded bushing and means for securing said bushing to said boring bar so that it will be rotated thereby.

3. A machine tool according to claim 1 in which the axis of said transversely extensible cutter is parallel to one side of the profile of the threads to be cut.

4. A machine tool for threading a restricted bore in a body, comprising a boring bar, means at one end of said bar for axially aligning said bar with said bore, a threaded guide member adapted to be aligned with said bore and to be secured to said body, complementary threaded means secured to the other end of said bar adapted to engage said guide member and to be rotated by said bar to guide the latter in a predetermined helical path, and a cutter on said bar intermediate said axial guide means and said helical guide means.

5. A machine tool according to claim 4 in which said cutter is transversely extensible, and including means operable independently of said boring bar for traversing said cutter.

6. A machine tool for operating in a restricted bore in a body comprising a boring bar, means at one end of said bar for axially aligning said bar with said bore, a threaded guide member adapted to be aligned with said bore, means for securing said member to said body, complementary threaded guide means encircling the other end of said bar and adapted selectively to engage both the said guide member and the said bar or only said bar, and a transversely extensible cutter on said bar intermediate said axial guide means and said threaded guide means.

IVAN H. IHM.
CHARLES F. TUTTLE.